United States Patent
Kojima

(10) Patent No.: US 8,225,831 B2
(45) Date of Patent: Jul. 24, 2012

(54) PNEUMATIC TIRE

(75) Inventor: Hiroyuki Kojima, Hiratsuka (JP)

(73) Assignee: The Yokohama Rubber Co., Ltd., Tokyo (JP)

(*) Notice: Subject to any disclaimer, the term of this patent is extended or adjusted under 35 U.S.C. 154(b) by 1142 days.

(21) Appl. No.: 12/089,577

(22) PCT Filed: Nov. 14, 2006

(86) PCT No.: PCT/JP2006/322631
§ 371 (c)(1),
(2), (4) Date: Apr. 8, 2008

(87) PCT Pub. No.: WO2007/058162
PCT Pub. Date: May 24, 2007

(65) Prior Publication Data
US 2009/0272473 A1 Nov. 5, 2009

(30) Foreign Application Priority Data
Nov. 16, 2005 (JP) .................. 2005-331422

(51) Int. Cl.
*B60C 11/11* (2006.01)
(52) U.S. Cl. ......... 152/209.15; 152/209.18; 152/209.21; 152/902
(58) Field of Classification Search ............. 152/209.15, 152/209.18, 209.21, 902
See application file for complete search history.

(56) References Cited

U.S. PATENT DOCUMENTS

| | | | |
|---|---|---|---|
| 2,706,509 A * | 4/1955 | White | 152/209.21 |
| 5,031,680 A | 7/1991 | Kajikawa et al. | |
| 5,957,180 A * | 9/1999 | Kuramochi et al. | 152/209.21 |
| 2005/0109437 A1 | 5/2005 | Shirouzu | |

FOREIGN PATENT DOCUMENTS

| | | | |
|---|---|---|---|
| DE | 3627832 | * | 2/1988 |
| DE | EP0393873 | * | 10/1990 |
| FR | 2476549 | * | 8/1981 |
| JP | U 56-75004 | | 6/1981 |
| JP | A 2-53608 | | 2/1990 |
| JP | 09-142105 | * | 6/1997 |
| JP | A 9-300915 | | 11/1997 |
| JP | A 11-170816 | | 6/1999 |
| JP | A 2002-19424 | | 1/2002 |
| JP | A 2005-153732 | | 6/2005 |

OTHER PUBLICATIONS

English Machine Translation of JP09-300915, Nov. 25, 1997.*

* cited by examiner

*Primary Examiner* — Steven D Maki
*Assistant Examiner* — Robert Dye
(74) *Attorney, Agent, or Firm* — Greer, Burns & Crain, Ltd.

(57) ABSTRACT

Provided is a pneumatic tire having a tread surface (1) with a tread pattern having: at least two circumferential grooves (2) extending in the tire circumferential direction to define land sections (3) on the outer sides in the tire width direction; and lateral grooves (4) extending in the tire width direction to partition the land sections (3) into a large number of blocks (5). In addition, in each of the blocks (5), a cutout (6) is formed in the center region of an edge portion of the block (5), the edge facing the corresponding circumferential groove (2). The cutout (6) has plural steps in the tire width direction. This structure improves the performance of running on a muddy ground with the resistance to uneven wear and the driving stability on general road surfaces maintained respectively at sufficient levels.

8 Claims, 2 Drawing Sheets

PNEUMATIC TIRE

This application is a national phase under 35 U.S.C. §371, of PCT International Application No. PCT/JP2006/322631, filed Nov. 14, 2006.

TECHNICAL FIELD

The present invention relates to a pneumatic tire. More specifically, the present invention relates to a pneumatic tire which has an improved performance of running on a muddy ground, and with which the resistance to uneven wear and the driving stability on general road surfaces are maintained respectively at sufficient levels.

BACKGROUND ART

Conventional tires to be mounted on four-wheel drive vehicles and light trucks need to be excellent in off-road running performance. In order to secure the off-road running performance, these tires employ a tread pattern formed primarily of a block pattern with a large number of edge portions. However, since such a tire having a block pattern has a tread contact area smaller than that of a tire having a rib pattern, the following problem arises. When the tire having a block pattern runs on general road surfaces, uneven wear called heel-and-toe wear is likely to occur in the surfaces of the blocks. In particular, in a case where lateral grooves of a large width are formed in such a tire in order to secure the performance of running on a muddy ground, uneven wear becomes more likely to occur. At the same time, since the block stiffness is reduced, the driving stability at the time of running on general road surfaces is deteriorated.

For the purpose of securing both on- and off-road running performances, the following proposal has heretofore been made. In this proposal, a projecting platform portion extending from the groove bottom is formed on a groove-wall surface in each tire circumferential groove (see, for example, Patent Document 1). However, in this proposal, the edge portions, in the circumferential direction, of each block is cut out over the entire length thereof, in the circumferential direction, by the formation of the platform portion. Accordingly the following problems arise. Since the block stiffness is reduced, the driving stability at the time of running on general road surfaces is deteriorated. In addition, an insufficient width of each block leads to a deterioration in the performance (particularly, the traction performance) at the time of running on a muddy ground.

Patent Document 1: Japanese Patent Application Kokai Publication No. Hei 9-300915

DISCLOSURE OF THE INVENTION

The present invention has been made to solve the above-described problems of the conventional tires. An object of the present invention is to provide a pneumatic tire which has an improved performance of running on a muddy ground, and with which the resistance to uneven wear and the driving stability on general road surfaces are maintained respectively at sufficient levels.

A pneumatic tire of the present invention for the purpose of achieving the above-described object has the following characteristics. The pneumatic tire has a tread surface having: at least two circumferential grooves extending in the tire circumferential direction to define land sections respectively on the outer sides in the tire width direction; and lateral grooves extending in the tire width direction to partition the land sections into a large number of blocks. The pneumatic tire is characterized in that a cutout having a plurality of steps in the tire width direction is formed in the center region of an edge portion of each of the blocks, the edge portion facing a corresponding one of the circumferential grooves.

According to the present invention, the land section on the outer side, in the tire width direction, of each circumferential groove is partitioned by the lateral grooves into the large number of blocks. Then, the cutout having the plurality of steps in the tire width direction is formed in the center region of the edge portion, facing the corresponding circumferential groove, of each of the blocks. Accordingly, since no cutout is formed in the front and rear sides, in the tire circumferential direction, of each block, the block stiffness is not substantially deteriorated. As a result, the stiffness thus maintained makes it possible to maintain the resistance to uneven wear and the driving stability at the time of running on general road surface respectively at sufficient levels.

Moreover, the kicking out muddy soil by the blocks each having a wide width, as well as the grasping of muddy soil by the cutouts improve the performance (particularly, the traction performance) at the time of running on a muddy ground.

Furthermore, since the improvement in the performance of running on a muddy ground eliminates the need for forming wider lateral grooves partitioning the land sections, this configuration is advantageous also in view of securing the resistance to uneven wear.

BEST MODES FOR CARRYING OUT THE INVENTION

Hereinafter, the configuration of the present invention will be described in detail with reference to the accompanying drawings.

Figure 1:
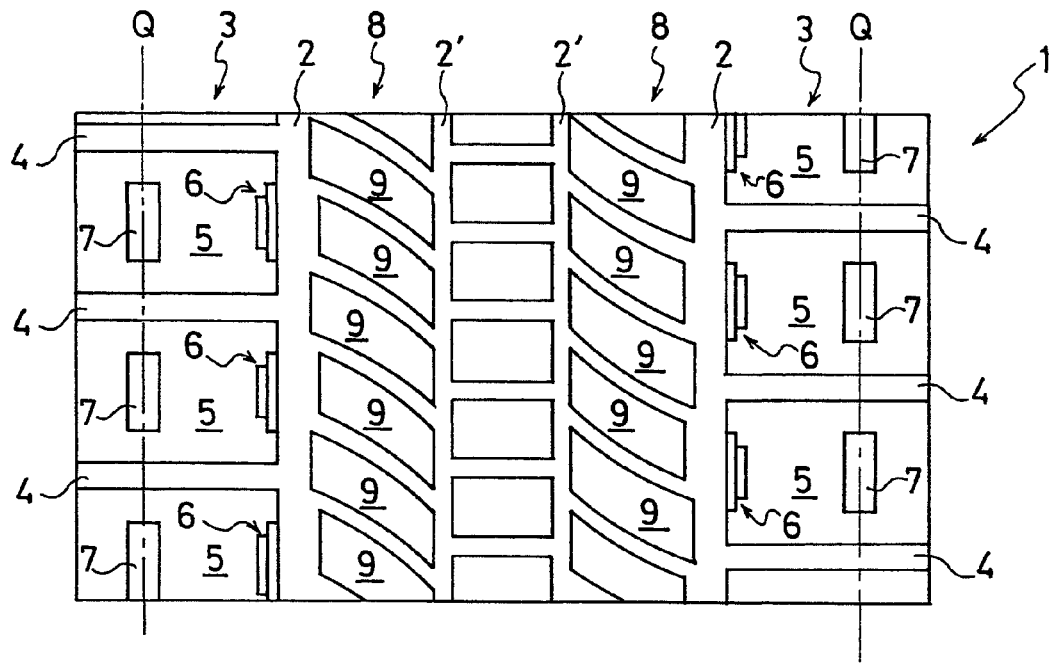
FIG. 1 is a partial plan view showing a tread pattern of a pneumatic tire according to the present invention.
Figure 3:
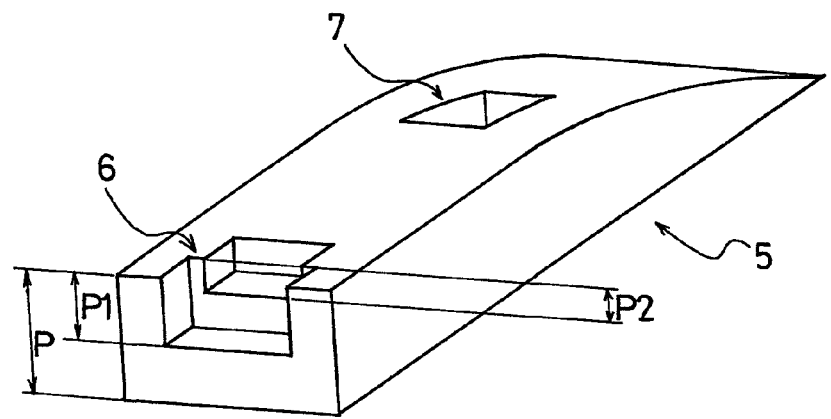
FIG. 3 is a perspective view of the block shown in FIG. 2.

As shown in FIG. 1, at least two circumferential grooves 2 and 2 (and additionally, circumferential grooves 2' and 2' in the figure) are formed in a tread surface 1. These circumferential grooves 2 and 2 extend in the tire circumferential direction, thus defining right and left land sections 3 and 3 on the outer sides, in the tire width direction, of the tread surface 1. These land sections 3 and 3 are partitioned by lateral grooves 4 each extending in the tire width direction, so that a large number of blocks 5 are formed. As shown in FIG. 3, a cutout 6 is formed in the center region of an edge portion, facing the corresponding circumferential groove 2, of each of the blocks 5. Each cutout 6 has two steps aligned in the tire width direction to be formed like a staircase. Note that, the center region of the edge portion, facing the corresponding circumferential groove 2, of each block 5 here is a region that does not include at least one of the front and rear edge portions, in the circumferential direction, of the block 5.

In this manner, each cutout 6 is formed in the center region of the edge portion, facing the corresponding circumferential groove 2, of the corresponding one of the blocks 5 on the sides of contact ends Q. Accordingly, since no cutout is formed in the front and rear sides, in the tire circumferential direction, of each block 5, the block stiffness is not substantially deteriorated. The rigidity thus maintained makes it possible to maintain the resistance to uneven wear and the driving stability at the time of running on general road surfaces respectively at sufficient levels.

Moreover, the kicking out muddy soil by the blocks 5 each having a wide width, as well as the grasping of muddy soil by the cutouts 6 improve the performance (particularly, the traction performance) at the time of running on a muddy ground. Furthermore, since the improvement in the performance of running on a muddy ground eliminates the need for forming wider lateral grooves 4 partitioning the land sections 3, this configuration is advantageous also in view of securing the resistance to uneven wear.

The position of each of the circumferential grooves 2 and 2 may be set so that the blocks 5 are formed in the shoulder portion on the corresponding side. Since the blocks in the shoulder portions largely affect the performance of running on a muddy ground, the formation of the cutouts 6 in these blocks makes it possible to effectively improve the performance of running on a muddy ground.

It is necessary that the number of steps forming each cutout 6 be two or more in terms of the following points. Specifically, these two or more steps make it possible to secure the resistance to uneven wear and the driving stability on general road surfaces by maintaining the stiffness of the blocks 5 at a sufficient level. At the same time, these two or more steps make it possible to achieve an improvement in performance of running on a muddy ground by enabling a large amount of muddy soil to be grasped. In other words, it is necessary to sufficiently secure the volume of each cutout 6 in order to improve the performance of running on a muddy ground. However, if the volume of each cutout 6 is too large, the stiffness of the blocks 5 is reduced. For this reason, two or more steps are formed in each cutout 6 so that the stiffness of the blocks 5 can be maintained as much as possible.

Figure 2:
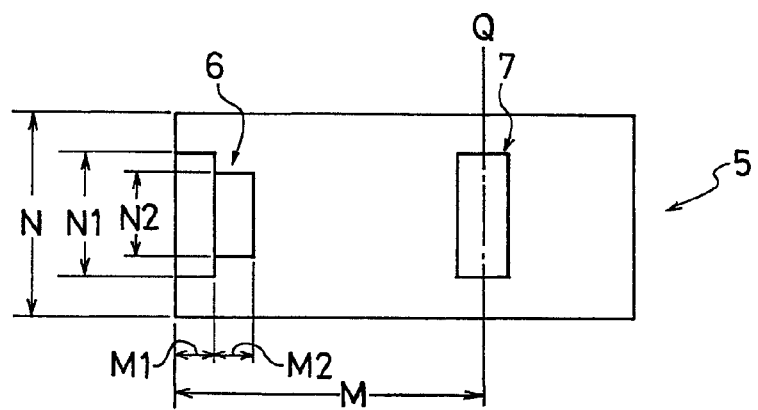
FIG. 2 is an enlarged plan view taking out, and thereby showing, a block on the outer side in the tire width direction in the pneumatic tire shown in FIG. 1.

In this respect, when two steps are formed in each cutout 6, it is preferable that the ratio $N1/N$ of $N1$ to $N$ be set in a range from 0.40 to 0.60, and also that the ratio $N2/N$ of $N2$ to $N$ be set in a range from 0.30 to 0.50. Here, as shown in FIG. 2, Reference Symbol $N1$ represents the length, in the tire circumferential direction, of a first step, on the groove bottom side of the corresponding circumferential groove 2, of each cutout 6; Reference Symbol $N2$ represents the length, in the tire circumferential direction, of a second step of each cutout 6; and Reference Symbol $N$ represents the length, in the tire circumferential direction, of each block 5. In addition, the relationship between the lengths $N1$ and $N2$, in the circumferential direction, of these first and second steps is set to satisfy $N1>N2$ in the above-described corresponding ranges.

When each of the lengths $N1$ and $N2$, in the circumferential direction, of the respective steps in each cutout 6 is above the above-described corresponding range, the block stiffness becomes insufficient. As a result, the resistance to uneven wear and the driving stability at the time of running on general road surfaces are deteriorated. On the other hand, when each of the lengths $N1$ and $N2$ is below the corresponding range, the amount of grasped muddy soil becomes insufficient, making impossible to achieve a sufficient level of the performance of running on a muddy ground. It should be noted that the length $N$, in the circumferential direction, of each block is a length, from an end portion in the circumferential direction to the other end portion in the circumferential direction, along the edge portion, facing the corresponding circumferential groove. Moreover, the lengths $N1$ and $N2$, in the circumferential direction, of the steps are also lengths parallel to the length $N1$.

Moreover, it is preferable that the ratio $M1/M$ of $M1$ to $M$ be set in a range from 0.05 to 0.10, and also that the ratio $M2/M$ of $M2$ to $M$ be set in a range from 0.06 to 0.12. Here, as shown in FIG. 2, Reference Symbol $M1$ represents the length, in the tire width direction, of the first step; Reference Symbol $M2$ represents the length, in the tire width direction, of the second step; and Reference Symbol $M$ represents a length, in the tire width direction, within the contact patch of each block 5. When each of the lengths $M1$ and $M2$, in the width direction, of the respective steps in each cutout is above the above-described corresponding range, the block stiffness becomes insufficient. As a result, the resistance to uneven wear and the driving stability at the time of running on general road surfaces are deteriorated. On the other hand, when each of the lengths $M1$ and $M2$ is below the corresponding range, the amount of grasped muddy soil becomes insufficient, making impossible to achieve a sufficient level of the performance of running on a muddy ground.

It should be noted that the length $M$, in the tire width direction, within the contact patch of each block 5 is set as follows. When the entirety of each block 5 is included within the contact patch, the length $M$ is a length in the width direction from the edge portion, on the inner side in the tire width direction of the block 5, to the edge portion, on the outer side in the tire width direction, thereof. On the other hand, when the end portion, on the outer side in the tire width direction, of each block 5 extends outward of the corresponding contact end Q, the length $M$ is a length in the width direction from the edge portion, on the inner side in the tire width direction, of the block 5 to the corresponding contact end Q. In addition, the contact ends Q are the right and left ends on the tread surface, which ends define the contact width of the tire. Here, the contact width is obtained in the following manner in accordance with the JATMA YEAR BOOK. Firstly, a pneumatic tire is mounted on a standard rim. Then, the pneumatic tire is inflated to an air pressure corresponding to 60% of the maximum air pressure specified in the correspondence table of air pressure and load carrying ability. When this air pressure is not described in the correspondence table, the pneumatic tire is inflated to an air pressure described with the closest conditions in the correspondence table. Thereafter, the inflated pneumatic tire is placed vertically on a flat plate in the stationary state, and is then loaded to its carrying ability corresponding to this air pressure described in the correspondence table. Consequently, the maximum linear distance, in the tire axial direction, at the contact patch of the tire with the flat plate in this state is employed as the contact width.

Furthermore, it is preferable that the ratio $P1/P$ of $P1$ to $P$ be set in a range from 0.60 to 0.80, and also that the ratio $P2/P$ of $P2$ to $P$ be set in a range from 0.45 to 0.60. Here, as shown in FIG. 3, Reference Symbol $P1$ represents the depth, from the tread surface, of the first step; Reference Symbol $P2$ represents the depth, from the tread surface, of the second step; and Reference Symbol $P$ represents the depth of each circumferential groove 2. It should be noted that the depth $P$ of the circumferential groove 2 is a depth from the tread surface in each block 5 to the groove bottom of the circumferential groove 2. The relationship between the depth $P1$ of the first step and the depth $P2$ of the second step is set to satisfy $P1>P2$ in the above-described corresponding ranges.

When each of the depths $P1$ and $P2$ of these steps of each cutout is above the above-described corresponding range, the block stiffness becomes insufficient, so that the resistance to uneven wear and the driving stability at the time of running on general road surfaces are deteriorated. On the other hand, when each of the depths $P1$ and $P2$ is below the corresponding range, the amount of grasped muddy soil becomes insufficient, making impossible to achieve a sufficient level of the performance of running on a muddy ground.

The volume of each cutout 6 is set by adjusting the specifications of each step in the above-described manner. Such a setting makes it possible to achieve a favorable performance of running on a muddy ground while securing the resistance to uneven wear and the driving stability on general road surfaces by preventing the block stiffness to be deteriorated. Accordingly, when three or more steps are formed in each cutout 6, the specifications of each step may be set on the basis of the volume of the above-described cutouts 6 each having two steps.

In the present invention, it is preferable that a second cutout having at least one step be formed in the center region in the edge portion, on the outer side in the tire width direction, that is, on the opposite side to the cutout 6, of each block 5. Moreover, when the edge portion, on the outer side in the tire width direction, of each block 5 extends outward of the corresponding contact end Q, it is preferable that a second cutout having at least one step be formed in the center region of the contact end Q of each block 5. When a second cutout 7 is formed in the center region of the contact end Q, or in the center region of the edge portion near the contact end Q, in each block 5 as described above, the second cutout 7 effectively grasps muddy soil at the vicinity of the contact end Q at the running on a muddy ground. Accordingly, it is possible to further improve the performance of running on a muddy ground. The above-described cutout 7 may be formed along the contact end Q, as shown in the figure, or may be formed in a vicinity of the contact end Q, inside each block 5.

It is preferable that the present invention be provided with the following configuration. Specifically, a land section 8, on the inner side in the tire width direction, of each circumferential groove 2 is formed in a block row constituted of blocks 9. Then, end portions, on the outer side in the tire width direction, of the respective blocks 9 constituting the block row 8 are displaced cyclically with respect to the tire circumferential direction, so that the groove width of the corresponding circumferential groove 2 is cyclically changed. At the same time, the cutout 6 formed in each block 5 is caused to face a portion having a wider width of the corresponding circumferential groove 2. With this configuration, each portion having the wider width of the circumferential grooves 2 as well as the cutout 6 of the corresponding block 5 are allowed to grasp a larger amount of muddy soil. Accordingly, it is possible to further improve the performance of running on a muddy ground.

In the pneumatic tire of the present invention, the cutout having the staircase-like steps is formed in each block in the land section, which largely affects the performance of running on a muddy ground, on each contact end side. The formation of the cutouts makes it possible to improve the performance of running on a muddy ground while maintaining the resistance to uneven wear and the driving stability at the time of running on general road surfaces at sufficient levels. Accordingly, the pneumatic tire of the present invention is preferably employed as a tire for a four-wheel drive vehicle or a light truck, which is designed for the purpose of off-road driving.

EXAMPLES

Figure 4:
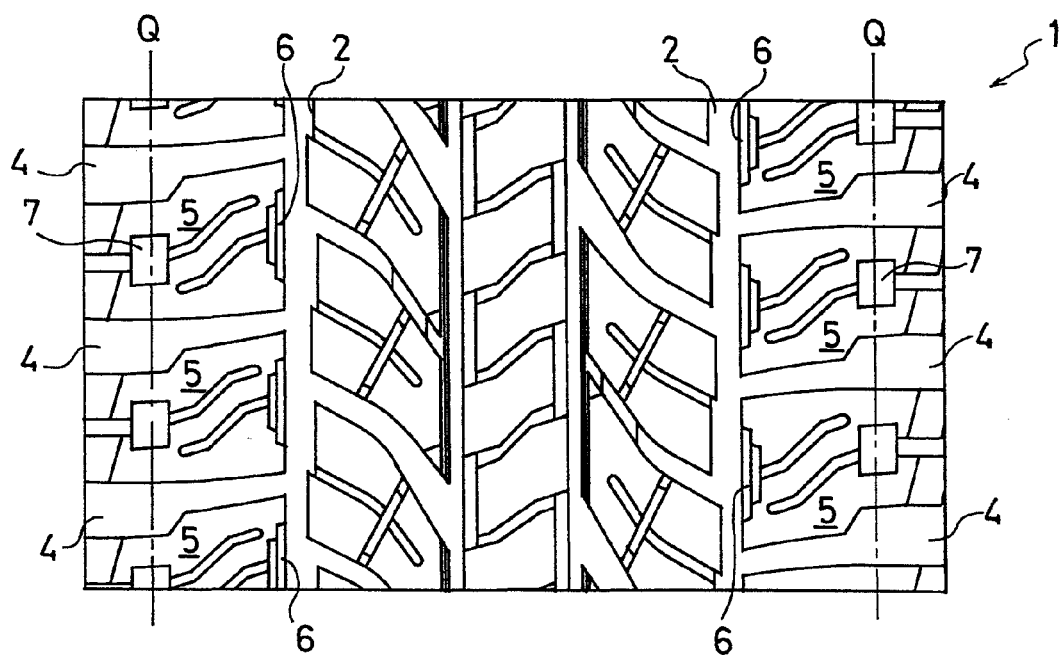
FIG. 4 is a partial plan view showing a tread pattern of a tire employed in an example.

A conventional pneumatic tire (Conventional Example), pneumatic tires of the present invention (Examples 1 to 7), and a pneumatic tire for comparison (Comparative Example) were prepared. Each of these tires had a tire size of 265/70R16 112, and a tread pattern shown in FIG. 4 although the cutouts 6 were not formed in the conventional tire. Concurrently, each of these tires was provided with the second cutouts 7 of one step formed therein. Here, each of the second cutouts 7 had a depth of 3.3 mm, a length of 10 mm in the circumferential direction, and a length of 3 mm in the width direction. Moreover, the tires of Examples 1 to 7 and Comparative Example were provided with different specifications of the cutouts 6 from one another as shown in Table 1.

Each of these tires was mounted onto a rim having a rim size of 16×7JJ, inflated to an air pressure of 200 kPa, and then mounted on a domestically-produced four-wheel drive vehicle (the engine displacement: 2500 cc). Each of these tires was evaluated in terms of the performance in driving stability, the performance in resistance to uneven wear, and the performance of running on a muddy ground by the following methods.

[Driving Stability]

The vehicle with each tire was driven 5 laps at an average speed of 80 km/h on a test course having the total length of 2.7 km of an asphalt road surface. Then, an organoleptic evaluation was carried out on each tire by an experienced test panelist. The results of the evaluation are shown by indices in Table 1 where the evaluation result of the conventional tire is taken as 100. The larger the index is, the more excellent the tire is in the driving stability.

[Resistance to Uneven Wear]

The vehicle with each tire was driven for 50,000 km at an average speed of 60 km/h on a general road surface primarily of an asphalt road surface. The amount of uneven wear generated in the blocks, on each contact end side, of the tire after the drive was measured. Then, the inverse number of the measured amount was taken as the performance in resistance to uneven wear resistance. The results of the evaluation are shown by indices in Table 1 where the evaluation result of the conventional tire is taken as 100. The larger the index is, the more excellent the tire is in the resistance to uneven wear.

[Performance of Running on Muddy Ground]

In a test course of a muddy road surface, a time taken for the vehicle with each tire to be driven to travel for a certain distance from a stop state was measured. Then, the inverse number of the measured time was taken as the performance of running on a muddy ground. The results were evaluated by indices where the result of the conventional example was taken as 100. The larger the value is, the more excellent the tire is in the performance of running on a muddy ground.

TABLE 1

| | | | Conventional Example | Example 1 | Example 2 | Example 3 | Example 4 | Example 5 | Example 6 | Example 7 | Comparative Example |
|---|---|---|---|---|---|---|---|---|---|---|---|
| | Cutout | | None | 2 Steps | 2 Steps | 2 Steps | 2 Steps | 2 Steps | 2 Steps | 2 Steps | 1 Step |
| Specifications of Cutout | | N1/N | — | 0.50 | 0.70 | 0.30 | 0.50 | 0.50 | 0.50 | 0.50 | 0.50 |
| | | N2/N | — | 0.40 | 0.60 | 0.20 | 0.40 | 0.40 | 0.40 | 0.40 | — |
| | | M1/M | — | 0.07 | 0.07 | 0.07 | 0.12 | 0.03 | 0.07 | 0.07 | 0.07 |
| | | M2/M | — | 0.08 | 0.08 | 0.08 | 0.14 | 0.04 | 0.08 | 0.08 | — |
| | | P1/P | — | 0.70 | 0.70 | 0.70 | 0.70 | 0.70 | 0.90 | 0.50 | — |
| | | P2/P | — | 0.55 | 0.55 | 0.55 | 0.55 | 0.55 | 0.70 | 0.35 | 0.55 |

TABLE 1-continued

|  |  | Conventional Example | Example 1 | Example 2 | Example 3 | Example 4 | Example 5 | Example 6 | Example 7 | Comparative Example |
|---|---|---|---|---|---|---|---|---|---|---|
| Evaluation | Driving Stability | 100 | 100 | 98 | 100 | 98 | 100 | 98 | 99 | 99 |
|  | Resistance to Uneven Wear | 100 | 100 | 98 | 100 | 98 | 100 | 98 | 99 | 99 |
|  | Performance of Running on Muddy Ground | 100 | 108 | 108 | 104 | 106 | 105 | 107 | 104 | 98 |

As is clear from Table 1, the pneumatic tire of the present invention makes it possible to improve the performance of running on a muddy ground without substantially deteriorating the resistance to uneven wear and the driving stability on general road surfaces.

What is claimed is:

1. A pneumatic tire having a tread surface comprising:
   at least two circumferential grooves extending in the tire circumferential direction to define land sections respectively on the outer sides in the tire width direction;
   lateral grooves extending in the tire width direction to partition the land sections into a plurality of blocks; and
   a cutout having a plurality of steps in the tire width direction formed in an edge portion of each of the blocks, the edge portion facing a corresponding one of the circumferential grooves,
   wherein each cutout is formed to have two steps,
   wherein the ratio N1/N of N1 to N is set in a range from 0.40 to 0.60, while the ratio N2/N of N2 to N is set in a range from 0.30 to 0.50, where N1 represents the length, in the tire circumferential direction, of a first step, on the groove bottom side of the corresponding circumferential grooves, of each cutout; N2 represents the length, in the tire circumferential direction, of a second step of each cutout; and N represents the length, in the tire circumferential direction, of each block, and
   wherein the ratio P1/P of P1 to P is set in a range from 0.60 to 0.80 while the ratio P2/P of P2 to P is set in a range from 0.45 to 0.65, where P1 represents the depth, from the tread surface, of the first step, on the groove bottom side of the corresponding circumferential grooves, of each cutout; P2 represents the depth, from the tread surface of the second step of each cutout; and P represents the depth of each of the circumferential grooves.

2. The pneumatic tire according to claim 1 wherein the blocks are formed in shoulder portions.

3. The pneumatic tire according to claim 1 wherein:
   the ratio M1/M of M1 to M is set in a range from 0.05 to 0.10 while the ratio M2/M of M2 to M is set in a range from 0.06 to 0.12,
   where M1 represents the length, in the tire width direction, of the first step, on the groove bottom side of the corresponding circumferential grooves, of each cutout,
   where M2 represents the length, in the tire width direction, of the second step of each cutout, and
   where M represents a length, in the tire width direction, within the contact patch of each block.

4. The pneumatic tire according to claim 1 wherein a second cutout having at least one step is formed in a center region in any one of, an outer edge portion on the outer side in the tire width direction, and a contact end, of each block.

5. The pneumatic tire according to claim 1, wherein:
   a land section, on the inner side in the tire width direction, of each of the circumferential grooves is formed in a block row,
   end portions, on the outer side in the tire width direction, of the respective blocks of the block row constituting the block row are displaced cyclically with respect to the tire circumferential direction, so that the groove width of the corresponding circumferential grooves is cyclically changed, and
   each cutout faces a portion having a wider width of the corresponding circumferential grooves.

6. The pneumatic tire according to claim 1, wherein said cutout is formed in a center region of the edge portion, and further wherein the center region of the edge portion is located between a front edge portion and a rear edge portion such that said cutout is recessed in the tire width direction with respect to both said front edge portion and said rear edge portion, wherein the edge portion includes both the front edge portion and the rear edge portion, and further wherein the front edge portion and the rear edge portion each face the corresponding circumferential groove.

7. The pneumatic tire according to claim 6, wherein the front edge portion and the rear edge portion are of approximately the same circumferential length.

8. The pneumatic tire according to claim 6, wherein the cutout is not formed in the front edge portion or in the rear edge portion.

* * * * *